US010500706B2

(12) United States Patent
Takeuchi et al.

(10) Patent No.: US 10,500,706 B2
(45) Date of Patent: Dec. 10, 2019

(54) POWER TOOL

(71) Applicant: MAKITA CORPORATION, Anjo-shi, Aichi (JP)

(72) Inventors: Hajime Takeuchi, Anjo (JP); Masanori Furusawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 655 days.

(21) Appl. No.: 15/157,700

(22) Filed: May 18, 2016

(65) Prior Publication Data
US 2016/0339577 A1 Nov. 24, 2016

(30) Foreign Application Priority Data

May 19, 2015 (JP) .................. 2015-101949

(51) Int. Cl.
*B25D 17/24* (2006.01)
*B25D 11/06* (2006.01)
*B25D 17/06* (2006.01)
*B23D 51/16* (2006.01)

(52) U.S. Cl.
CPC ............ *B25D 17/24* (2013.01); *B23D 51/16* (2013.01); *B25D 11/062* (2013.01); *B25D 17/06* (2013.01); *B25D 2217/0019* (2013.01); *B25D 2250/371* (2013.01)

(58) Field of Classification Search
CPC ...... B25D 11/062; B25D 17/24; B25D 16/00; B25D 2211/061; B25D 2250/371
USPC ........................................... 173/48, 118, 201
See application file for complete search history.

(56) References Cited

U.S. PATENT DOCUMENTS

| 4,325,436 A | * | 4/1982 | Richter ............... | B25D 11/062 173/118 |
| 4,446,931 A | * | 5/1984 | Bleicher ............. | B25D 16/006 173/109 |
| 4,719,976 A | * | 1/1988 | Bleicher ............. | B25D 16/003 173/109 |

(Continued)

FOREIGN PATENT DOCUMENTS

EP      2415564 A1    2/2012
EP      2674257 A1    12/2013

(Continued)

OTHER PUBLICATIONS

JP2009061552A Translation, Sep. 27, 2018.*

(Continued)

*Primary Examiner* — Andrew M Tecco
*Assistant Examiner* — Eyamindae C Jallow
(74) *Attorney, Agent, or Firm* — Oliff PLC

(57) ABSTRACT

A rational technique which can realize vibration suppression and reduction of unstable driving elements of a striker. A representative power tool, a first compensation mechanism moves a swinging mechanism from a swinging mechanism reference position to a swinging mechanism moving position and moves a cylinder to a second side, thereby increasing the volume of an air chamber. Further, the second compensation mechanism moves an intermediate element from an intermediate reference position to an intermediate element moving position and moves a striking element to the second side, thereby compensating the volume of the air chamber.

9 Claims, 13 Drawing Sheets

(56) References Cited

U.S. PATENT DOCUMENTS

| | | | | |
|---|---|---|---|---|
| 4,895,212 | A * | 1/1990 | Wache | B25D 16/003 173/109 |
| 5,379,848 | A * | 1/1995 | Rauser | B25D 16/003 173/109 |
| 5,435,397 | A * | 7/1995 | Demuth | B25D 11/005 173/109 |
| 5,842,527 | A * | 12/1998 | Arakawa | B25D 16/006 173/48 |
| 5,954,140 | A * | 9/1999 | Bauer | B25D 16/00 173/109 |
| 7,051,820 | B2 * | 5/2006 | Stirm | B25D 16/00 173/109 |
| 8,281,873 | B2 * | 10/2012 | Ullrich | B25D 16/006 173/104 |
| 2006/0048955 | A1 * | 3/2006 | Saur | B25D 16/006 173/48 |
| 2007/0000677 | A1 * | 1/2007 | Nakashima | B25D 17/24 173/217 |
| 2008/0169112 | A1 * | 7/2008 | Heep | B25D 11/125 173/114 |
| 2008/0283264 | A1 | 11/2008 | Ikuta et al. | |
| 2011/0259623 | A1 * | 10/2011 | Yoshikane | B25D 16/003 173/176 |

FOREIGN PATENT DOCUMENTS

| | | | | |
|---|---|---|---|---|
| JP | 2008-279586 | A | | 11/2008 |
| JP | 2009-061552 | A | | 3/2009 |
| JP | 2009061552 | A | * | 3/2009 ........... B25D 11/062 |
| JP | 2012-240188 | A | | 12/2012 |

OTHER PUBLICATIONS

Jan. 23, 2017 Search Report issued in European Patent Application No. 16170175.0.

Oct. 23, 2018 Office Action issued in Japanese Patent Application No. 2015-101949.

* cited by examiner

POWER TOOL

TECHNICAL FIELD

The present invention relates to a power tool for performing an operation on a workpiece by linearly driving a tool accessory.

BACKGROUND ART

Japanese Unexamined Patent Application Publication No. 2009-061552 A discloses a power tool having a swinging mechanism, a piston cylinder that is reciprocated by the swinging mechanism and houses a striking element, and an air chamber that is defined by the piston cylinder and the striking element. In the power tool, the striking element is driven by pressure fluctuations of the air chamber caused by reciprocating movement of the piston cylinder based on the swinging movement of the swinging mechanism and then collides with the tool accessory, so that the tool accessory is linearly driven.

The tool accessory is configured to move the piston cylinder and the swinging mechanism rearward of a reference position by reaction force caused when the piston cylinder compresses air of the air chamber and to return the piston cylinder and the swinging mechanism to the reference position. With this structure, vibration suppression can be realized.

SUMMARY OF THE INVENTION

Problem to be Solved by the Invention

Above-described structure of the power tool is effective to a certain extent for suppression of vibration caused in the power tool. However, the volume of the air chamber changes when the piston cylinder and the swinging mechanism move rearward. Therefore, further improvement is desired for stable driving of a striking element.

Accordingly, it is an object of the present invention to provide a further rational technique which can realize vibration suppression and reduction of unstable driving elements of the striking element.

The above-described problem can be solved by a claimed invention. According to the invention, a representative power tool is provided to perform a prescribed operation on a workpiece by linearly moving a tool accessory. The power tool includes a body which forms an outer shell of the power tool mainly by a gear housing and a motor housing. The body has an inner housing that houses an internal mechanism. Further, the body has a handgrip to be held by a user.

The body houses a tool holder for holding the tool accessory, a driving motor, a rotary shaft member that is rotationally driven by the driving motor, and a striking mechanism that linearly drives the tool accessory along with rotation of the rotary shaft member. The tool holder is configured to removably hold the tool accessory. The body further has a power cable and a buttery mounting part in order to secure a power source for driving the driving motor. As for arrangement of the rotary shaft member and the driving motor in the body, various structures can be selected in the power tool. For example, a rotation axis of the driving motor and a rotation axis of the rotary shaft member may be arranged in parallel to each other, or transversely to each other.

The striking mechanism has a cylinder that is configured to be allowed to linearly reciprocate, a striking element that is housed in the cylinder and configured to be allowed to linearly reciprocate within the cylinder, an air chamber that is defined by the striking element and the cylinder, a swinging mechanism that is connected to the cylinder and reciprocates the cylinder by swinging along with rotation of the rotary shaft member, and an intermediate element that is housed in the tool holder and configured to be allowed to reciprocate. The cylinder can be formed by a bottomed cylindrical body, and in this case, the bottom of the cylinder and the striking element can define the air chamber.

With the above-described structure of the power tool, the striking element is caused to collide with the intermediate element via pressure fluctuations caused in the air chamber by reciprocating movement of the cylinder, and the intermediate element is further caused to collide with the tool accessory, thereby linearly moving the tool accessory.

The power tool further defines a longitudinal direction parallel to a cylinder moving axis and a transverse direction crossing the longitudinal direction. The longitudinal direction defines a first side to which the cylinder compresses air of the air chamber, and a second side opposite to the first side. The first side which is a side of the tool holder in the power tool can also be referred to as a front side in the power tool. Further, the second side which is a side of the handgrip in the power tool can also be referred to as a rear side in the power tool.

The body further houses a volume compensation mechanism for compensating the volume of the air chamber. The volume compensation mechanism includes a first compensation mechanism and a second compensation mechanism. The first compensation mechanism is configured to allow the swinging mechanism to reciprocate between a swinging mechanism reference position located on the first side and a swinging mechanism moving position located on the second side. Further, the first compensation mechanism has a first biasing member that biases the swinging mechanism so as to place the swinging mechanism in the swinging mechanism reference position when the swinging mechanism is placed in the swinging mechanism moving position. Specifically, the first compensation mechanism is configured such that the swinging mechanism can slide in a reciprocating manner with respect to the rotation axis. Further, the cylinder is caused to slide in a reciprocating manner by interlocking with the sliding movement of the swinging mechanism.

The second compensation mechanism is configured to allow the intermediate element to reciprocate between an intermediate element reference position located on the first side and an intermediate element moving position located on the second side. The intermediate element reference position is defined by a position where the intermediate element collides with the striking element. Further, the second compensation mechanism has a second biasing member that biases the intermediate element so as to place the intermediate element in the intermediate element reference position when the intermediate element is placed in the intermediate element moving position.

In the volume compensation mechanism, the first compensation mechanism moves the swinging mechanism from the swinging mechanism reference position to the swinging mechanism moving position by a reaction force generated by movement of the cylinder from the second side to the first side. Further, this reaction force is generated when air of the air chamber is compressed to the maximum. The first compensation mechanism can cushion the reaction force and suppress vibration by moving the swinging mechanism to the swinging mechanism moving position together with the cylinder. In this sense, it can be said that the first compensation mechanism is a vibration suppressing mechanism.

Further, when the cylinder is moved to the second side along with the movement of the swinging mechanism, the volume of the air chamber is increased. The increase of the volume of the air chamber is caused by inflow of air into the cylinder through an air hole which is provided for smooth reciprocating movement of the cylinder.

When the first compensation mechanism increases the volume of the air chamber, the second compensation mechanism moves the intermediate element from the intermediate element reference position to the intermediate element moving position by the reaction force generated by the prescribed operation of the tool accessory, and the striking element is moved to the second side along with the movement of the intermediate element. As a result, the volume of the air chamber is compensated.

Further, in a continuous operation, air of the air chamber is repeatedly compressed by the swinging movement of the swinging mechanism. If air of the air chamber is compressed without making volume compensation, air of the air chamber is compressed at a different compression ratio from the previous compression ratio, so that the driving state of the tool accessory varies. In the power tool of the present invention, the second compensation mechanism can compensate for changes caused in the volume of the air chamber by operation of the first compensation mechanism. Therefore, the power tool can be obtained which can realize vibration suppression and reduction of unstable driving elements of the striking element.

The first compensation mechanism returns the swinging mechanism from the swinging mechanism moving position to the swinging mechanism reference position by the first biasing member. Thus, the first compensation mechanism can continuously exhibit the above-described vibration suppressing function.

Further, the second compensation mechanism returns the intermediate element from the intermediate element moving position to the intermediate element reference position by the second biasing member. As a result, the intermediate element is arranged on the tool accessory side, so that energy obtained by collision with the striking element can be more efficiently transmitted to the tool accessory.

Further, the power tool which linearly drives the tool accessory includes an electric hammer or electric hammer drill which performs a crushing operation on a workpiece such as concrete, and an electric reciprocating saw which performs a cutting operation on a workpiece such as wood.

In another aspect of the power tool according to the present invention, the rotary shaft member may be configured to extend in the longitudinal direction. Further, the body has a first bearing member that supports a prescribed region of the rotary shaft member on the first side, a second bearing member that supports a prescribed region of the rotary shaft member on the second side, and a first biasing member arrangement region in which one end of the first biasing member is arranged. In this case, a prescribed region of the second bearing member and a prescribed region of the first biasing member can be arranged on the same line in the transverse direction. In other words, it can be said that at least part of the region of the first biasing member is arranged within an extending virtual region of the second bearing member in the transverse direction. Further, when the first biasing member is a coil spring, the first biasing member arrangement region can form a guide part which protrudes from the body so as to extend through an inside diameter part of the coil spring.

According to the power tool of this aspect, at least part of the region of the first biasing member can be arranged in an outer region of the second bearing member. Therefore, it is not necessary to provide the first biasing member on the rotary shaft member, so that the extending length of the rotary shaft member can be shortened. In this sense, it can be said that the rotary shaft member has a first biasing member non-arrangement region.

In another aspect of the power tool according to the present invention, the driving motor can have an output shaft having an output gear, and the rotary shaft member can have a driven gear member having gear teeth for engagement with the output gear. In this case, a prescribed region of the gear teeth and a prescribed region of the first biasing member can be arranged on the same line in the transverse direction. In other words, it can be said that at least part of the region of the first biasing member is arranged within an extending virtual region of the gear teeth in the transverse direction.

According to the power tool of this aspect, at least part of the region of the first biasing member can be arranged in an outer region of the driven gear member. Therefore, it is not necessary to provide the first biasing member on the driven gear member, so that the extending length of the rotary shaft member can be shortened. In this sense, it can be said that the driven gear member has a first biasing member non-arrangement region.

In another aspect of the power tool according to the present invention, the driven gear member can have a longitudinally extending part that extends in the longitudinal direction and is press-fitted onto the rotary shaft member. Further, the first biasing member can have a support member that extends in the transverse direction, and an elastic element that is arranged between the support member and the first biasing member arrangement region and biases the support member from the second side to the first side. The support member has a swinging mechanism side region that abuts on the swinging mechanism, an elastic element side region that abuts on the elastic element, and a support member hole that extends through the longitudinally extending part. Further, the support member can be configured to be allowed to slide in a reciprocating manner with respect to the longitudinally extending part. In this case, a prescribed region of the longitudinally extending part and a prescribed region of the elastic element can be arranged on the same line in the transverse direction. In other words, it can be said that at least part of the region of the elastic element is arranged within an extending virtual region of the longitudinally extending part in the transverse direction. Further, the support member can be suitably formed by a metal plate-like body.

According to the power tool of this aspect, the longitudinally extending part of the driven gear member with respect to the rotary shaft member is arranged to overlap with the elastic element in the transverse direction, so that the extending length of the rotary shaft member can be shortened and the biasing force of the elastic element can be efficiently transmitted to the swinging mechanism by the support member.

In another aspect of the power tool according to the present invention, the elastic element can be a plurality of coil springs. In this case, the coil springs can be arranged to be equally spaced apart from the support member hole on opposite sides of the support member hole in the transverse direction.

According to the power tool of this aspect, the coil springs can be arranged in a prescribed region of the body in a peripheral region of the driven gear member, so that a space within the body can be effectively utilized. As a result, size reduction of the power tool can be realized.

In another aspect of the power tool according to the present invention, the driving motor can have an output shaft having an output gear, and a first rotation axis that is defined by rotation of the output shaft. The rotary shaft member can have a driven gear member that is engaged with the output gear, and a second rotation axis that is defined by rotation of the rotary shaft member. The driven gear member can be a bevel gear and have a transversely extending part extending in the transverse direction. In this case, the driving motor and the rotary shaft member are arranged such that the first rotation axis and the second rotation axis cross each other. Further, the first biasing member can be the elastic element arranged between the transversely extending part and the swinging mechanism.

According to the power tool of this aspect, with the structure in which the first rotation axis of the driving motor and the second rotation axis of the rotary shaft member are arranged to cross each other, size increase of the driving motor can be realized compared with a power tool in which the first and second rotation axes are arranged in parallel to each other. Specifically, even in the power tool of the high output type, the structure can be obtained which can realize vibration suppression and reduction of unstable driving elements of the striking element.

In another aspect of the power tool according to the present invention, the elastic element can be a conical spring having a large-diameter part and a small-diameter part. In this case, the large-diameter part can be arranged toward the transversely extending part and the small-diameter part can be arranged toward the swinging mechanism.

According to the power tool of this aspect, the conical spring can be efficiently arranged in a peripheral region of the rotary shaft member, so that size reduction of the power tool can be realized.

In another aspect of the power tool according to the present invention, the intermediate element can have a first region including a first end on the first side, a second region including a second end on the second side and an intermediate region formed between the first region and the second region. The second compensation mechanism can have a covering member that covers the first region, the intermediate region and at least part of the second region. The covering member can have a longitudinal wall extending in the longitudinal direction, a transverse wall extending in the transverse direction and a covering member opening that is formed in the transverse wall and through which the second region is inserted. In this case, the second biasing member can be a coil spring which is arranged between the transverse wall and a prescribed region of the intermediate region.

More specifically, the intermediate element can have the first region in the form of a large-diameter region having a larger diameter than the second region, and the second region in the form of a small-diameter region. Further, a stepped region provided between the large-diameter region and the small-diameter region can be formed as the intermediate region. In this structure, the covering member can cover the large-diameter region, the stepped region and at least part of the small-diameter region. Further, a region of the small-diameter region which is not covered by the covering member extends through the covering member opening.

According to the power tool of this aspect, the coil spring can bias the intermediate element to the first side. As a result, the intermediate element moved to the second side can be promptly moved to the first side. Therefore, continuous operation can be efficiently performed.

According to the present invention, a further rational technique can be provided which can realize vibration suppression and reduction of unstable driving elements of the striking element.

DETAILED EXPLANATION OF THE PREFERRED EMBODIMENTS

Figure 12:
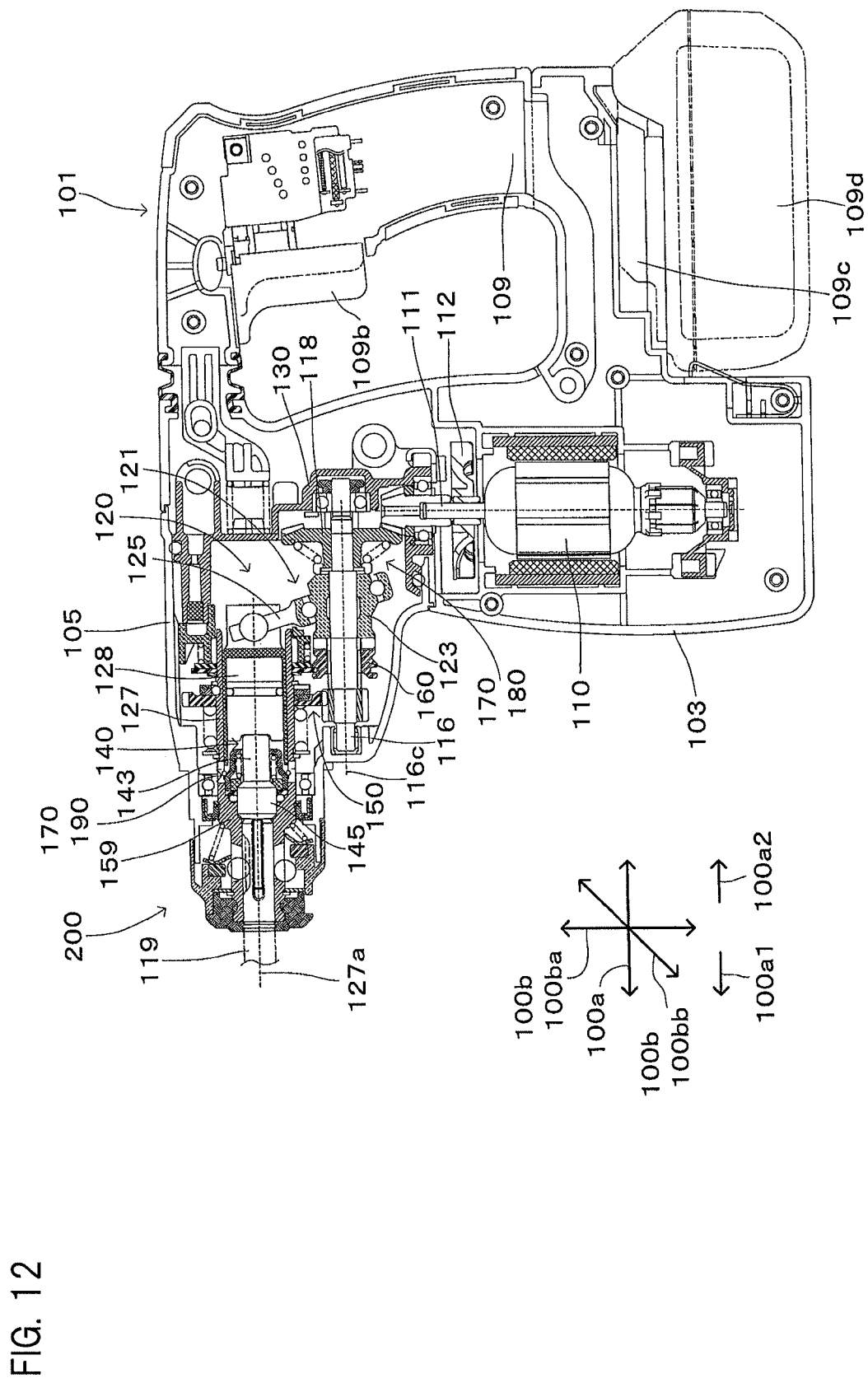
FIG. 12 is a sectional side view of a hammer drill according to a second embodiment of the present invention.
Figure 13:
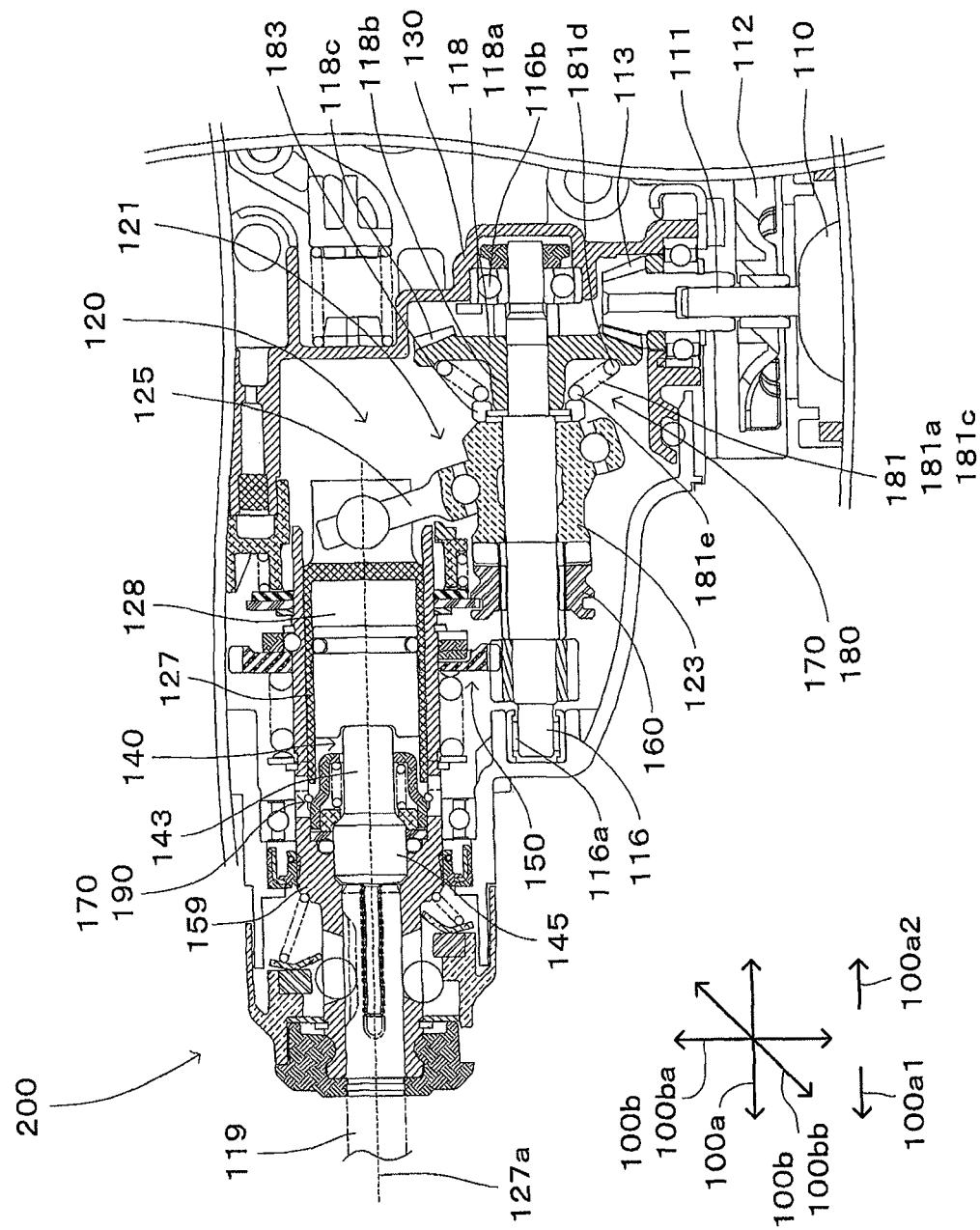
FIG. 13 is an explanatory drawing for illustrating an outline of the first compensation mechanism and the second compensation mechanism.

Representative embodiments of a power tool according to the present invention are now explained with reference to FIGS. 1 to 13. FIGS. 1 to 11 show a first embodiment, and FIGS. 12 and 13 show a second embodiment. In the embodiments, a hammer drill is explained as a representative example of the power tool of the present invention.

First Embodiment

Figure 1:
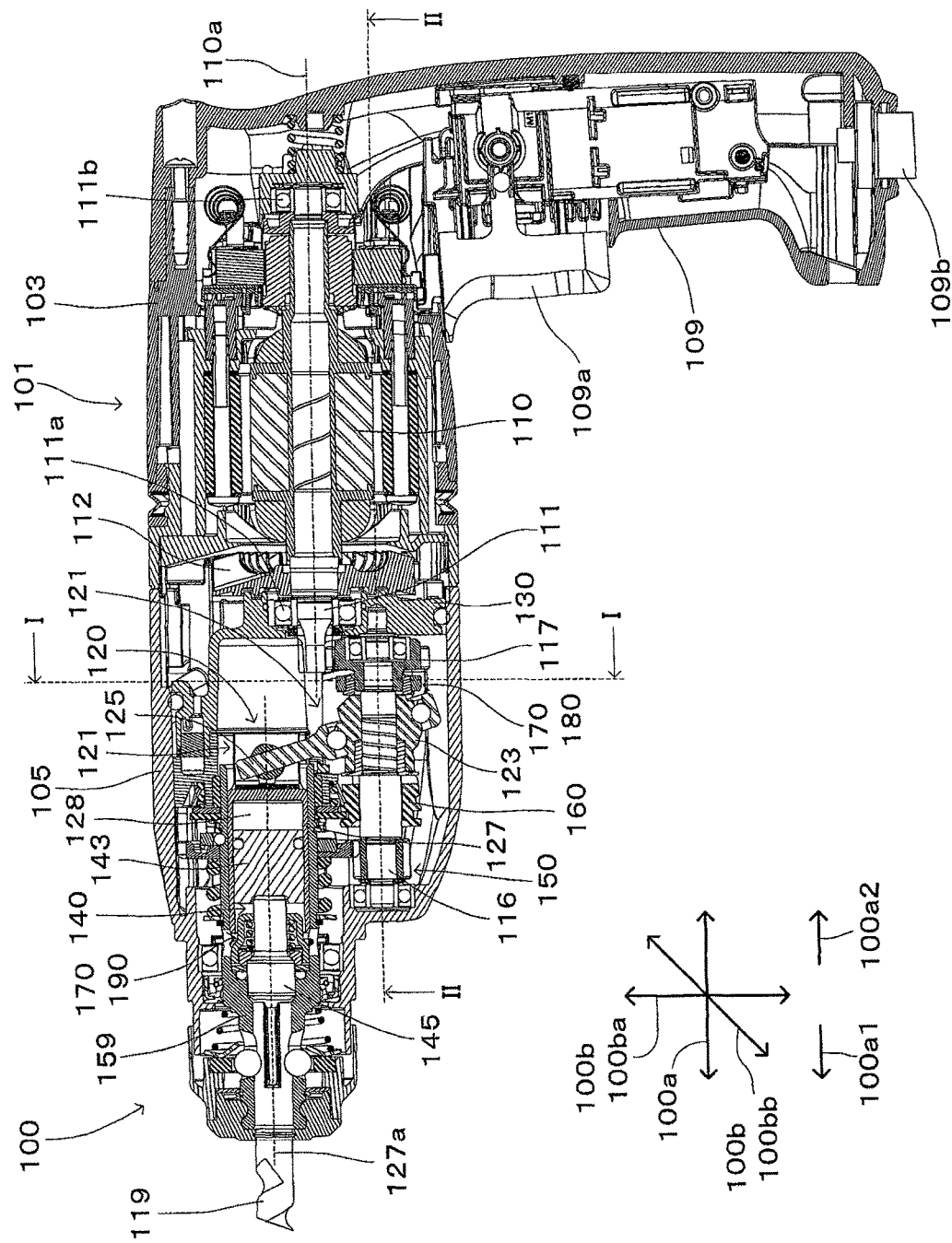
FIG. 1 is a sectional side view of a hammer drill according to a first embodiment of the present invention.

FIG. 1 is a sectional view for illustrating the outline of a hammer drill 100. As shown in FIG. 1, the hammer drill 100 is a hand-held power tool having a handgrip 109 to be held by a user. The hammer drill 100 is configured to perform hammering motion for a hammering operation on a workpiece by linearly driving a tool bit 119 in the axial direction of the tool bit 119 and to perform rotating motion for a drilling operation on a workpiece by rotationally driving the tool bit 119 around an axis of the tool bit 119. The user can select the drive mode of the tool bit 119 by operating a mode change lever (not shown). The hammer drill 100 of this embodiment has hammer drill mode in which the tool bit 119 is caused to perform hammering motion and rotating motion, and drill mode in which the tool bit 119 is caused to only perform rotating motion. The hammer drill 100 and the tool bit 119 are example embodiments that correspond to the "power tool" and the "tool accessory", respectively, according to the present invention.

(Basic Structure of the Hammer Drill)

As shown in FIG. 1, a body housing 101 of the hammer drill 100 includes a gear housing 105 and a motor housing 103 which form an outer shell of the hammer drill 100, and an inner housing 130 that houses an internal mechanism. The body housing 101 further has a handgrip 109 to be held by a user. The body housing 101 is an example embodiment that corresponds to the "body" according to the present invention.

As shown in FIG. 1, the handgrip 109 has a trigger 109a for energizing a driving motor 110, and a power cable 109b for supplying an electric current to the driving motor 110. When the user holds the handgrip 109 and operates the trigger 109a, an electric current is supplied to the driving motor 110 through the power cable 109b and the tool bit 119 is driven in a predetermined drive mode. The driving motor 110 is an example embodiment that corresponds to the "driving motor" according to the present invention.

Figure 2:
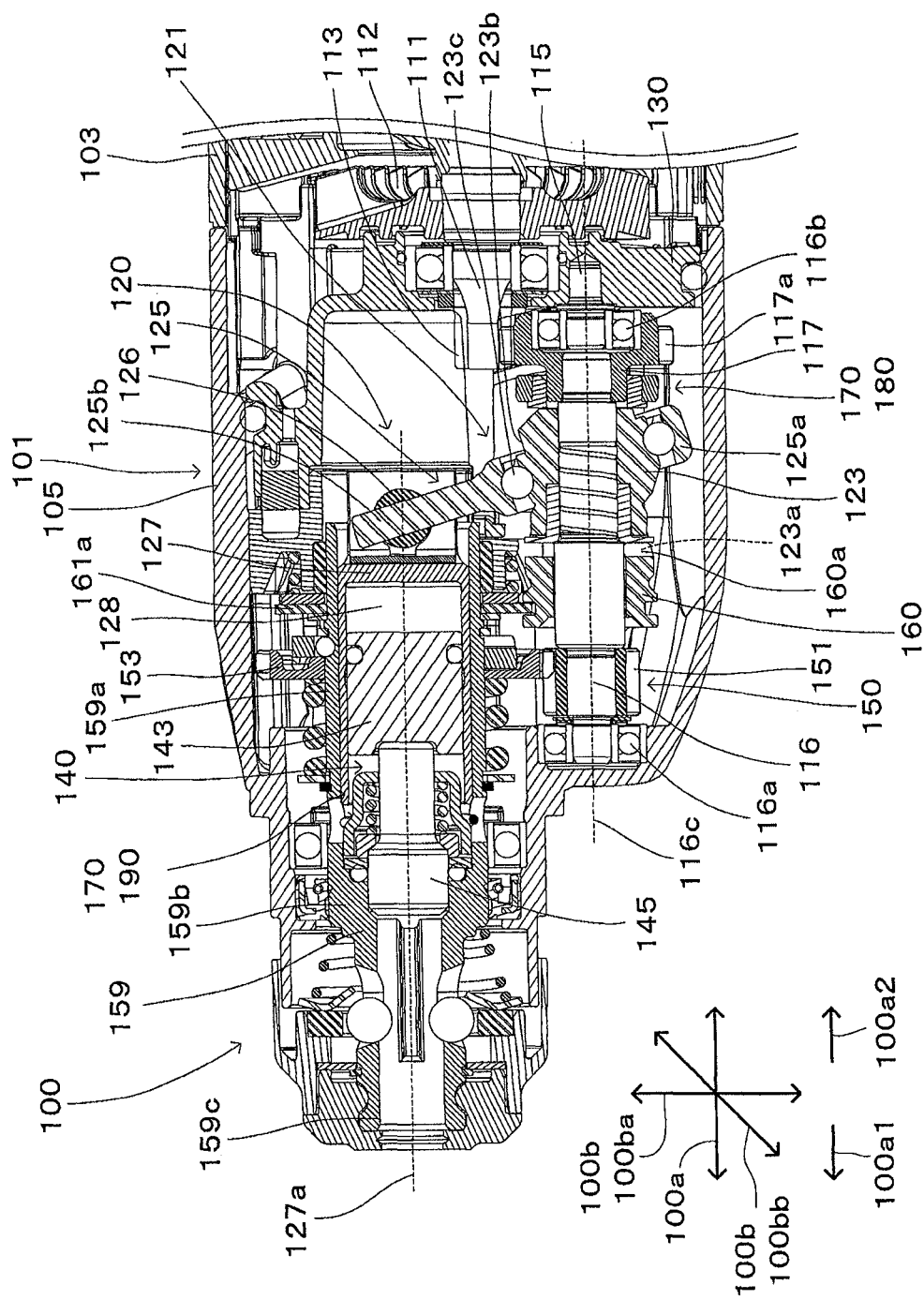
FIG. 2 is an enlarged sectional view showing an essential part of a tool bit driving mechanism.

As shown in FIG. 1, a tool holder 159 is configured to removably hold the tool bit 119 and arranged to be rotatable with respect to the body housing 101. The tool holder 159 is an example embodiment that corresponds to the "tool holder" according to the present invention. As shown in FIG. 2, the tool holder 159 has a piston housing region 159a, an impact bolt housing region 159b and a tool bit housing region 159c, and a second compensation mechanism 190 which is described below is housed in the tool holder 159.

As shown in FIG. 1, the driving motor 110 has an output shaft 111. The output shaft 111 is rotatably supported by a bearing 111a fixed to the inner housing 130 and a bearing 111b fixed to the motor housing 103. A fan 112 which can rotate together with the output shaft 111 and a pinion gear 113 are provided on the output shaft 111. The fan 112 sends air to the driving motor 110 by rotation of the output shaft 111 and cools the driving motor 110. Rotation of the output shaft 111 defines a rotation axis 110a. The output shaft 111, the pinion gear 113 and the rotation axis 110a are example embodiments that correspond to the "output shaft", the "output gear" and the "first rotation axis", respectively, according to the present invention.

(Tool Bit Driving Mechanism)

The structure of a tool bit driving mechanism for driving the tool bit 119 within the body housing 101 is now explained.

As shown in FIG. 1, the tool bit driving mechanism mainly includes a striking mechanism 120 for linearly driving the tool bit 119, and a rotation transmitting mechanism 150 for rotationally driving the tool bit 119. The striking mechanism 120 and the rotation transmitting mechanism 150 are driven along with rotation of an intermediate shaft 116. As shown in FIG. 2, the intermediate shaft 116 is rotated by a driven gear member 117 which engages with the pinion gear 113 of the driving motor 110, and defines a rotation axis 116c.

Figure 3:
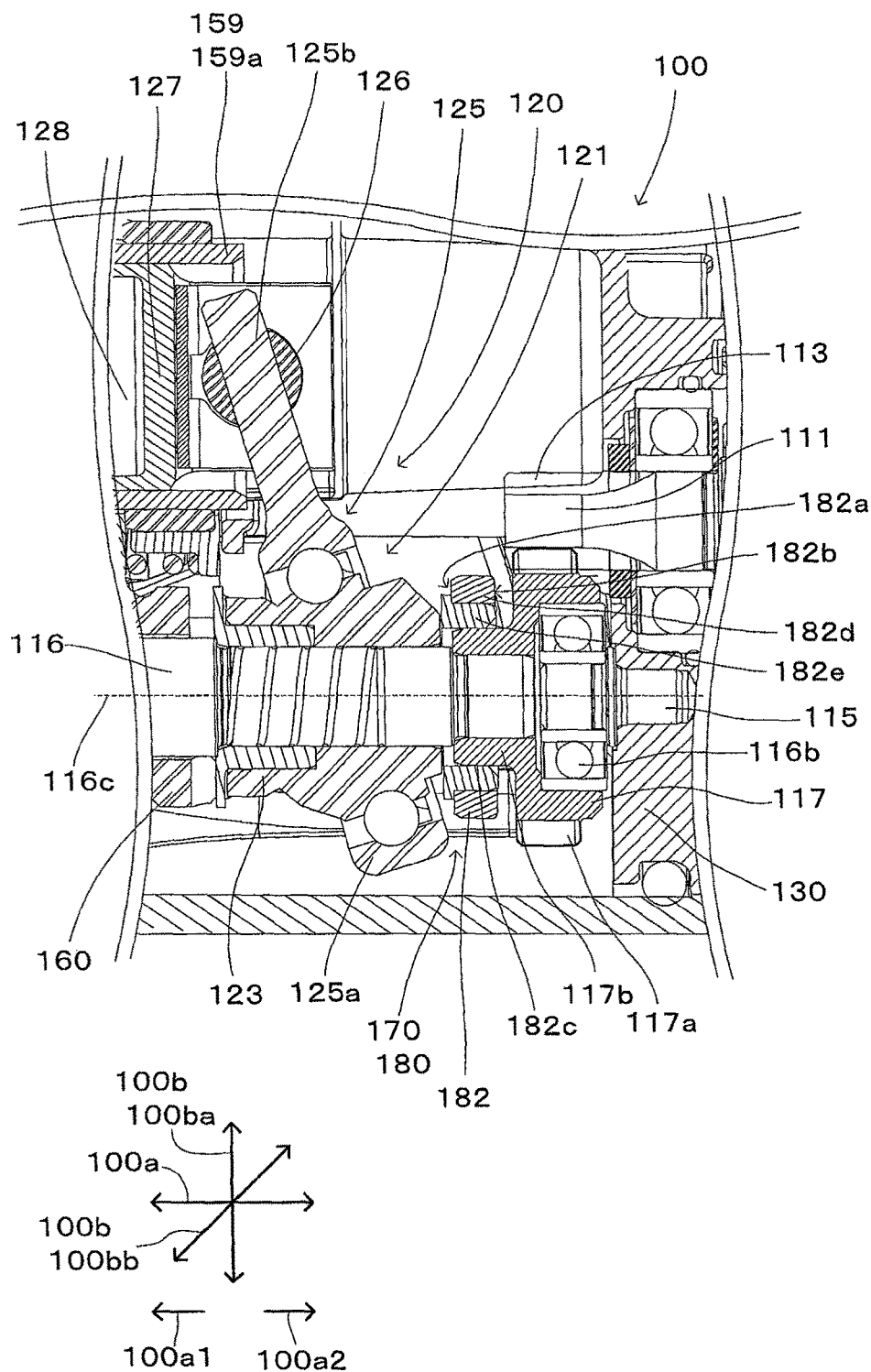
FIG. 3 is an explanatory drawing for illustrating an outline of a first compensation mechanism.

As shown in FIG. 3, the driven gear member 117 has gear teeth 117a and a longitudinally extending part 117b which is press-fitted onto the intermediate shaft 116. A region of the driven gear member 117 having the gear teeth 117a is press-fitted onto (an outside diameter part of) the bearing 116b. The inner housing 130 has a pin member 115, and the pin member 115 has a region which is press-fitted into the inner housing 130 and a region which is press-fitted into (an inside diameter part of) the bearing 116b.

With such a structure, as shown in FIG. 1, a front region of the intermediate shaft 116 is supported by a bearing 116a provided in the gear housing 105, and a rear region of the intermediate shaft 116 is supported by the bearing 116b.

The intermediate shaft 116 and the rotation axis 116c are example embodiments that correspond to the "rotary shaft member" and the "second rotation axis", respectively, according to the present invention. The driven gear member 117, the gear teeth 117a and the longitudinally extending part 117b are example embodiments that correspond to the "driven gear member", the "gear teeth", and the "longitudinally extending part", respectively, according to the present invention. The bearing 116a and the bearing 116b are example embodiments that correspond to the "first bearing member" and the "second bearing member", respectively, according to the present invention.

(Rotation Transmitting Mechanism)

As shown in FIG. 2, the rotation transmitting mechanism 150 has a second gear 153 which engages with a first gear 151. The first gear 151 is integrally formed with the intermediate shaft 116, and the second gear 153 is integrally formed with the piston housing region 159a of the tool holder 159. With this structure, rotation of the intermediate shaft 116 is transmitted to the first gear 151, the second gear 153 and the tool holder 159, so that the tool bit 119 can be rotationally driven.

(Striking Mechanism)

As shown in FIG. 2, the striking mechanism 120 has a swinging mechanism 121 and a striking element 140. The striking mechanism 120 and the swinging mechanism 121 are example embodiments that correspond to the "striking mechanism" and the "swinging mechanism", respectively, according to the present invention.

As shown in FIG. 2, the swinging mechanism 121 mainly includes a rotary body 123 and a swinging shaft 125. The rotary body 123 is configured to be rotatable with respect to the intermediate shaft 116. The rotary body 123 has an outer circumferential surface 123b having a prescribed inclination angle with respect to the rotation axis 116c. The swinging shaft 125 has an annular part 125a and a shaft part 125b. The annular part 125a is mounted onto the outer circumferential surface 123b of the rotary body 123 via a plurality of steel balls 123c and surrounds the rotary body 123, and the shaft part 125b is provided to extend upward from the annular part 125a and connected to the piston 127 via a joint pin 126. With this structure, the annular part 125a moves following inclination of the inclined surface 123b which changes as the rotary body 123 rotates. Accordingly, the shaft part 125b is caused to swing in the longitudinal direction (back-and-forth direction) along the rotation axis 116c. The piston 127 is then caused to linearly reciprocate by a linear motion component of the swinging motion of the shaft part 125b.

The swinging mechanism 121 is biased by a first compensation mechanism 180 which is described below, and configured to be allowed to linearly reciprocate with respect to the intermediate shaft 116. Further, the piston 127 connected to the swinging mechanism 121 is also caused to reciprocate by the reciprocating movement of the swinging mechanism 121.

As shown in FIG. 2, the striking element 140 mainly includes the piston 127 which is configured as a bottomed cylindrical member and slidably disposed in a bore of the piston housing region 159a of the tool holder 159a, a striking element in the form of a striker 143 which is slidably disposed within the piston 127, and an intermediate element in the form of an impact bolt 145 which is slidably disposed within the tool holder 159 and transmits kinetic energy of the striker 143 to the tool bit 119. The reciprocating movement of the piston 127 defines a piston moving axis 127a. The piston 127, the striker 143, the impact bolt 145 and the piston moving axis 127a are example embodiments that correspond to the "cylinder", the "striking element", the "intermediate element" and the "cylinder moving axis", respectively, according to this invention.

As shown in FIG. 2, an air chamber 128 is formed between the bottom of the piston 127 and the striker 143. The striker 143 is linearly driven by pressure fluctuations which is caused within the air chamber 128 when the piston 127 reciprocates. The air chamber 128 is an example embodiment that corresponds to the "air chamber" according to the present invention.

As shown in FIG. 1, the hammer drill 100 defines a longitudinal direction 100a parallel to the piston moving axis 127a, and a transverse direction 100b crossing the longitudinal direction 100a. The longitudinal direction 100a defines a front side 100a1 to which the piston 127 compresses air of the air chamber 128, and a rear side 100a2 opposite to the front side 100a1. The longitudinal direction 100a, the transverse direction 100b, the front side 100a1 and the rear side 100a2c are example embodiments that correspond to the "longitudinal direction", the "transverse direction", the "first side" and the "second side", respectively, according to the present invention.

The transverse direction 100b is a concept indicating all directions crossing the longitudinal direction 100a. As shown in FIG. 1, in the transverse direction 100b, a direction having a component in the extending direction of the handgrip 109 and perpendicularly crossing the longitudinal direction 100a is defined as a height direction 100ba, and a direction perpendicularly crossing the longitudinal direction 100a and the height direction 100ba is defined as a width direction 100bb. In the height direction 100ba, a direction in which the handgrip 109 extends is defined as a lower side, and a direction opposite to the lower side is defined as an upper side. Further, in the width direction 100bb, one direction is defined as one side in the width direction, and a direction opposite to the one side in the width direction is defined as the other side in the width direction.

When these definitions of the directions are applied to the main structure of the hammer drill 100, the tool bit 119 and the handgrip 109 are disposed on the front side 100a1 and the rear side 100a2, respectively, with respect to the body housing 101. The piston moving axis 127a, the rotation axis 116c of the intermediate shaft 116 and the rotation axis 110a of the driving motor 110 are parallel to the longitudinal direction 100a.

As shown in FIG. 2, a clutch cam 160 is spline connected onto the intermediate shaft 116. The clutch cam 160 is interlocked with user's operation of the mode change lever and moved in the back-and-forth direction. Detailed description of the mode change lever is omitted for convenience sake.

When hammer drill mode is selected with the mode change lever, the clutch cam 160 is moved to the rear side 100a2, and clutch teeth 160a of the clutch cam 160 engage with clutch teeth 123a of the rotary body 123. Thus, in this case, the tool holder 159 is rotationally driven and the rotary body 123 is rotated, so that the tool bit 119 is enabled to perform hammering motion and rotating motion at the same time.

On the other hand, when drill mode is selected with the mode change lever, the clutch cam 160 is moved to the front side 100a1, and the clutch teeth 160a are disengage from the clutch teeth 123a. Thus, in this case, the tool holder 159 is rotationally driven, but rotation of the intermediate shaft 116 is not transmitted to the rotary body 123, so that the piston 127 is not driven. Therefore, the tool bit 119 is enabled to only perform rotating motion. FIGS. 1 and 2 show the state in which hammer drill mode is selected.

(Volume Compensation Mechanism)

A volume compensation mechanism 170 is now described with reference to FIGS. 3 to 7. The volume compensation mechanism 170 includes the first compensation mechanism 180 shown in FIGS. 3 to 6 and the second compensation mechanism 190 shown in FIG. 7. The volume compensation mechanism 170, the first compensation mechanism 180 and the second compensation mechanism 190 are example embodiments that correspond to the "volume compensation mechanism", the "first compensation mechanism" and the "second compensation mechanism", respectively, according to this invention.

(First Compensation Mechanism)

Figure 11:
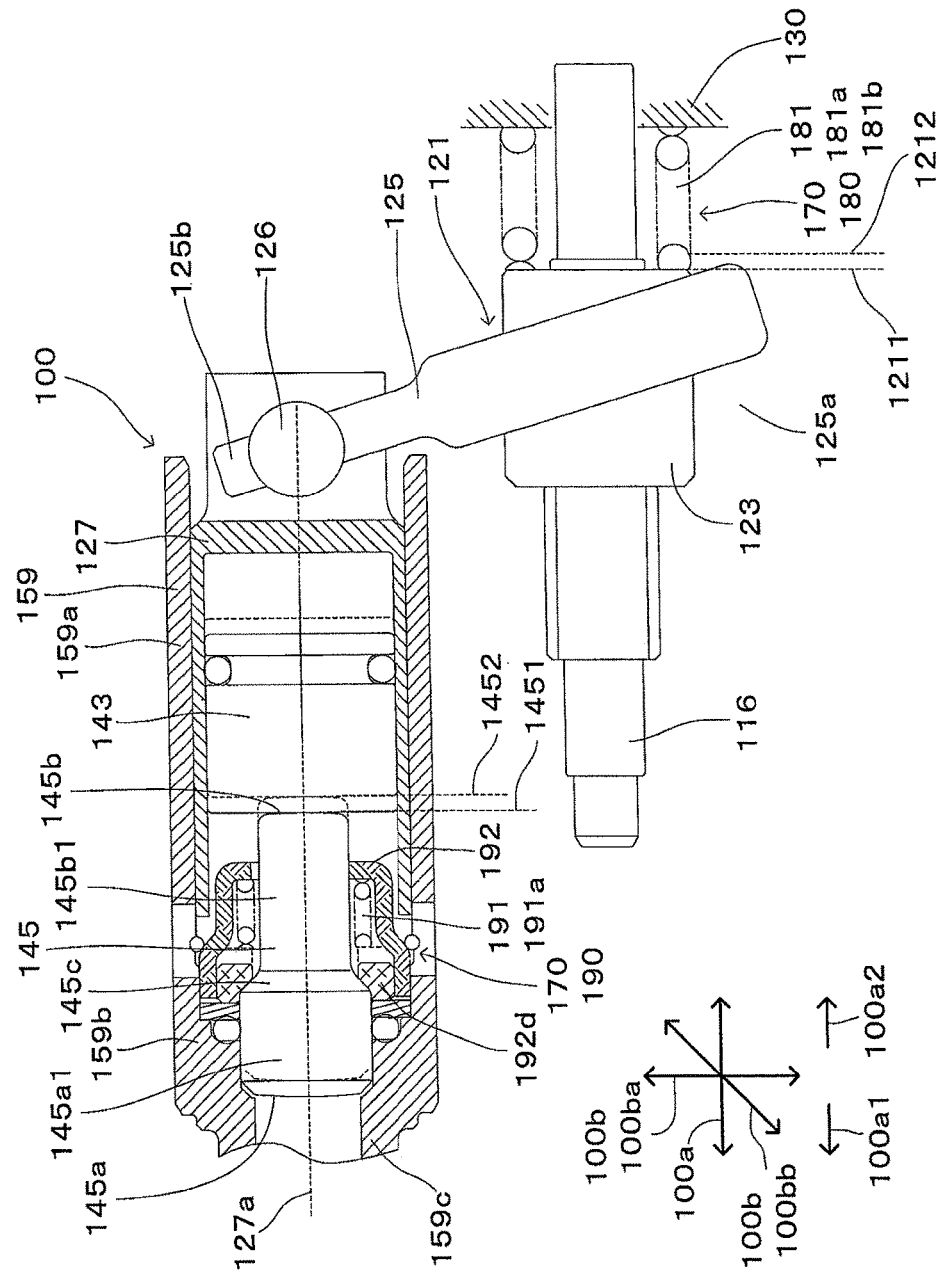
FIG. 11 is an explanatory drawing for showing operations of the first compensation mechanism and the second compensation mechanism.

As shown in FIG. 11, the first compensation mechanism 180 is configured to allow the swinging mechanism 121 to reciprocate between a swinging mechanism reference position 1211 located on the front side 100a1 and a swinging mechanism moving position 1212 located on the rear side 100a2. Further, the first compensation mechanism 180 is configured to return the swinging mechanism 121 to the swinging mechanism reference position 1211 when the swinging mechanism 121 is placed in the swinging mechanism moving position 1212. The swinging mechanism reference position 1211 and the swinging mechanism moving position 1212 are example embodiments that correspond to the "swinging mechanism reference position" and the "swinging mechanism moving position", respectively, according to this invention.

Figure 5:
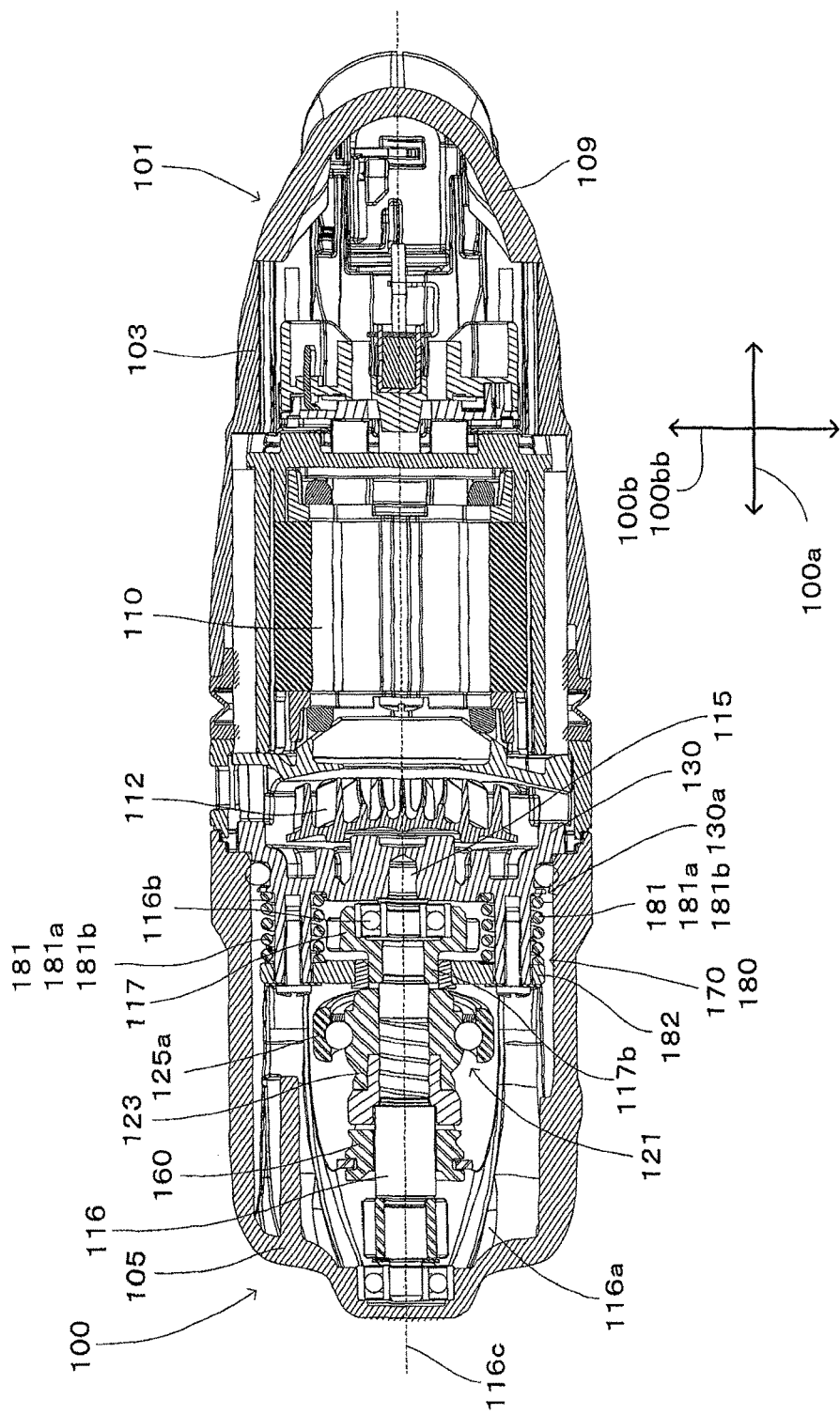
FIG. 5 is a sectional view taken along line II-II in FIG. 1.

The first compensation mechanism 180 is disposed between the swinging mechanism 121 and the inner housing 130 as shown in FIG. 3, and has a support member 182 and a first biasing member 181 as shown in FIG. 5. The support member 182 and the first biasing member 181 are example embodiments that correspond to the "support member" and the "first biasing member", respectively, according to this invention. FIG. 5 is a sectional view taken along line II-II in FIG. 1.

Figure 4:
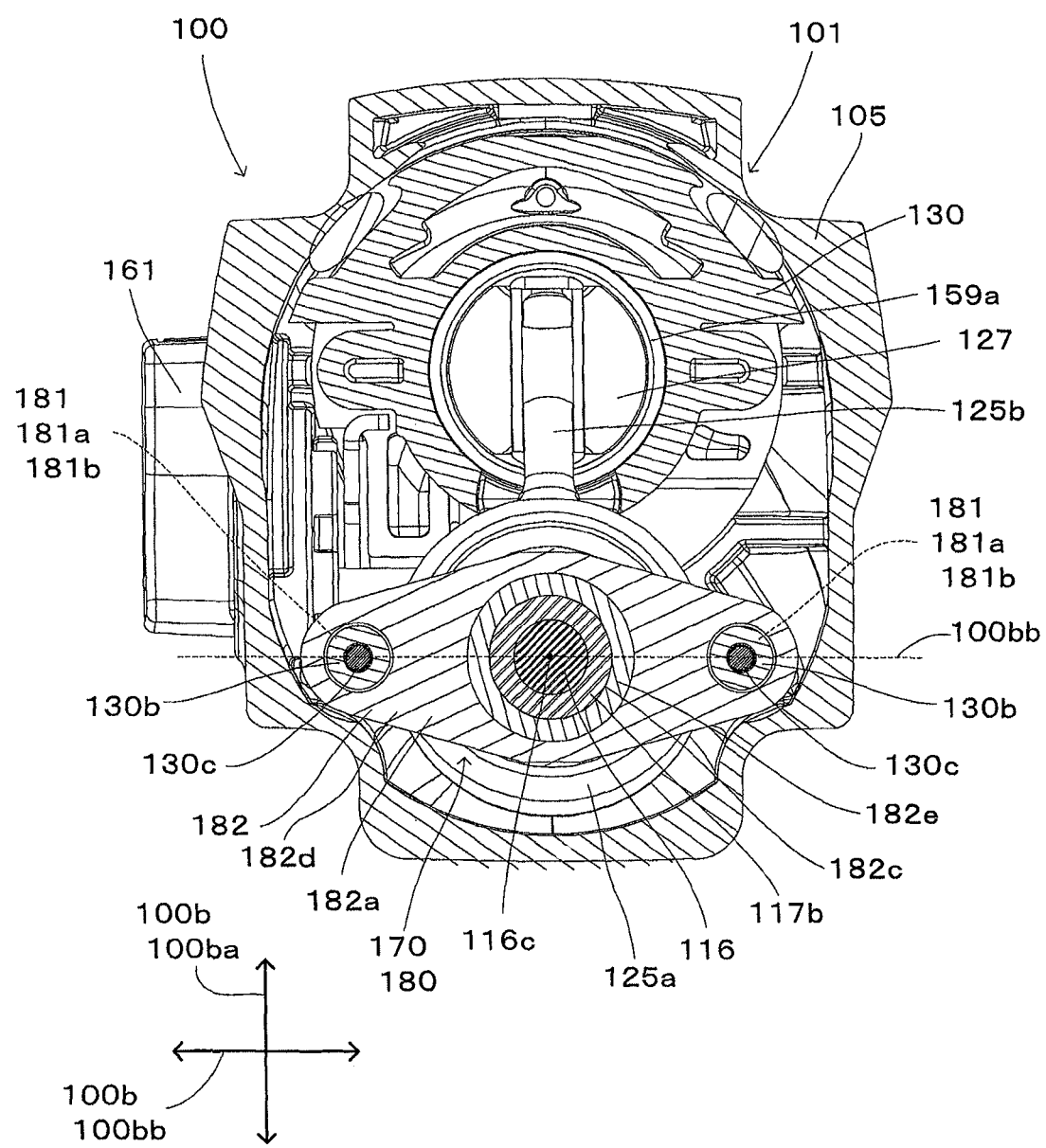
FIG. 4 is a sectional view taken along line I-I in FIG. 1.

FIG. 4 is a sectional view taken along line I-I in FIG. 1. The support member 182 extends in the transverse direction 100b (the height direction 100ba, the width direction 100bb) as shown in FIG. 4. As shown in FIG. 3, the support member 182 has a front region 182a which abuts on the swinging mechanism 121, a rear region 182b and a hole 182c, and the support member 182 is configured to be allowed to slide in a reciprocating manner with respect to the longitudinally extending part 117b. The front region 182a, the rear region 182b and the hole 182c are example embodiments that correspond to the "swinging mechanism side region", the "elastic element side region" and the "support member hole", respectively, according to the present invention. The first biasing member 181 is disposed between the rear region 182b and the inner housing 130 as shown in FIG. 5.

The support member 182 further has a plate-like part 182d and a flange ring part 182e as shown in FIG. 3. The flange ring part 182e is integrally formed with the plate-like part 182d and has a flange region which abuts on the swinging mechanism 121 and a cylindrical region which defines the hole 182c. With this structure, the flange ring part 182e directly abuts on the swinging mechanism 121 and can slide with respect to the longitudinally extending part 117b. Therefore, the flange ring part 182e is formed of a metal material having high wear resistance compared with the plate-like part 182d. A front end of the first biasing member 181 which is described below abuts on the rear region 182b of the plate-like part 182d.

As shown in FIG. 5, the first biasing member 181 is an elastic element 181a, and the elastic element 181a is formed by a plurality of coil springs 181b. In the hammer drill 100, two coil springs 181b are used to form the biasing element 181a. The number of the coil springs 181b to be used can be appropriately set according to the structure of the hammer drill. The elastic element 181a and the coil spring 181b are example embodiments that correspond to the "elastic element" and the "coil spring", respectively, according to the present invention.

Figure 6:
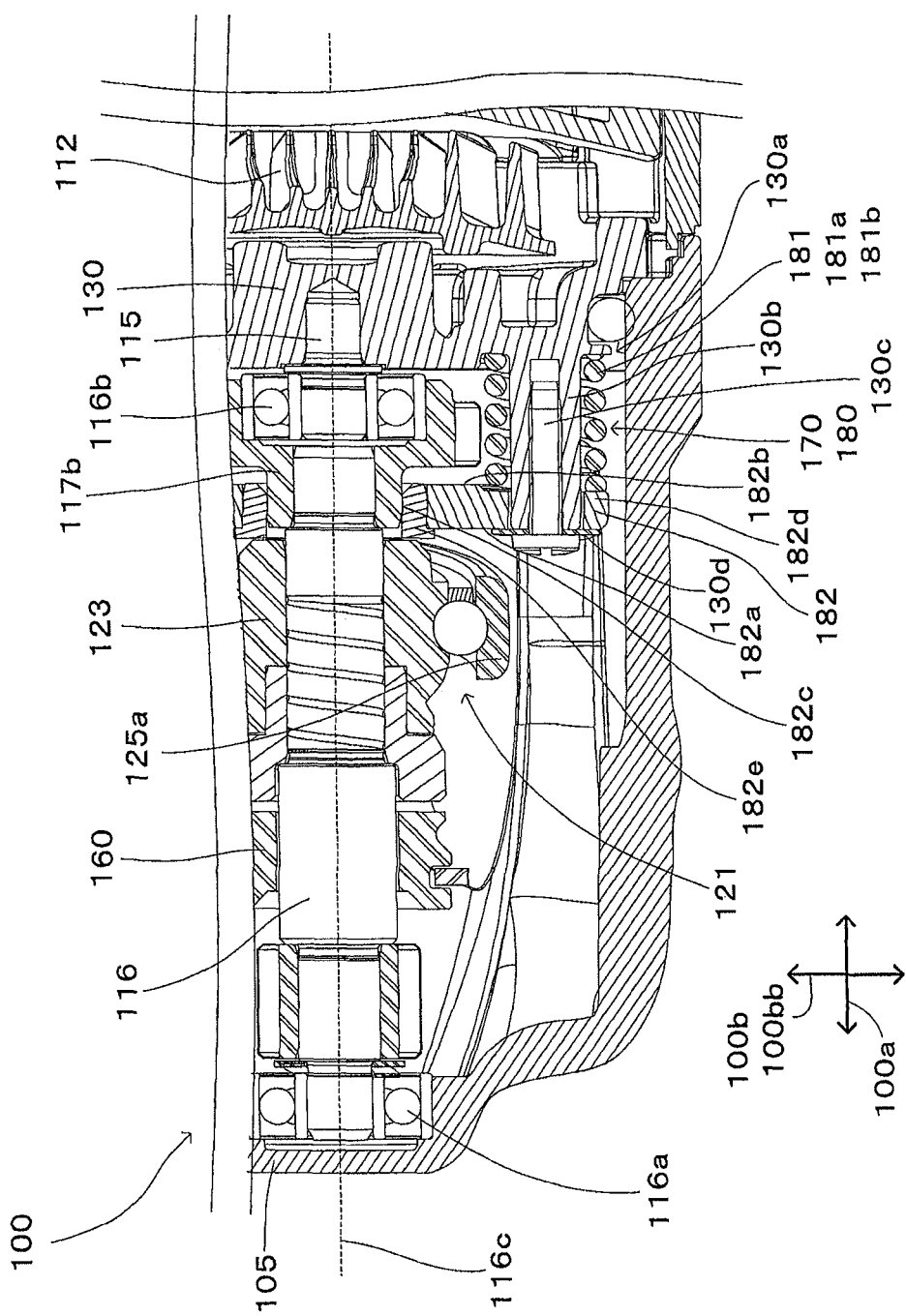
FIG. 6 is an explanatory drawing for illustrating an outline of the first compensation mechanism.

As shown in FIG. 6, the coil spring 181b is arranged in an arrangement region 130a provided in a prescribed region of the inner housing 130. A guide part 130b is formed in the arrangement region 130a and protrudes to the front side 100a1. The support member 182 is arranged on the front side 100a1 of the guide part 130b, and the coil spring 181b is arranged on the rear side 100a2 of the support member 182. A screw 130c is disposed on a front end of the guide part 130b on the front side 100a1 via a washer 130d. The washer 130d is configured to prevent the support member 182 and the coil spring 181b from coming off. The arrangement region 130a is an example embodiment that corresponds to the "first biasing member arrangement region" according to the present invention. The guide part 130b is provided inside the coil spring 181b, so that the coil spring 181b can be prevented from being inclined when compressed.

As shown in FIG. 4, a pair of the coil springs 181b are arranged to be equally spaced apart from the hole 182c on opposite sides of the hole 182c in the transverse direction 100b. With this arrangement, a space in a peripheral region of the driven gear member 117 can be effectively utilized.

The rotation axis 116c of the intermediate shaft 116 and axes of contraction and expansion of the coil springs 181b are arranged on the same line in the width direction 100bb. With this arrangement, the coil springs 181b can efficiently bias the swinging mechanism 121 and the piston 127 to the front side 100a1 via the support member 182.

Further, as shown in FIG. 5, a prescribed region of the bearing 116b which supports the intermediate shaft 116 and prescribed regions of the coil springs 181b are arranged on the same line in the width direction 100bb. With this arrangement, it is not necessary to arrange the coil spring 181b on the intermediate shaft 116, so that the extending length of the intermediate shaft 116 can be shortened.

Further, as shown in FIG. 5, a prescribed region of the gear teeth 117a and prescribed regions of the coil springs 181b are arranged on the same line in the width direction 100bb. Further, as shown in FIG. 5, a prescribed region of the longitudinally extending part 117b of the driven gear member 117 and prescribed regions of the coil springs 181b are arranged on the same line in the width direction 101bb.

With this arrangement, the extending length of the intermediate shaft 116 can be shortened. In other words, increase of the length of the intermediate shaft 116 which is required to arrange the first compensation mechanism 180 can be suppressed, and the extending length of the intermediate shaft 116 can be effectively utilized.

(Second Compensation Mechanism)

As shown in FIG. 11, the second compensation mechanism 190 is configured to allow the impact bolt 145 to reciprocate between an impact bolt reference position 1451 located on the front side 100a1 and an impact bolt moving position 1452 located on the rear side 100a2. The impact bolt reference position 1451 is a position where the striker 143 collides with the impact bolt 145. Further, the second compensation mechanism 190 is configured to return the impact bolt 145 to the impact bolt reference position 1451 when the impact bolt 145 is placed in the impact bolt moving position 1452. The impact bolt reference position 1451 and the impact bolt moving position 1452 are example embodiments that correspond to the "intermediate element reference position" and the "intermediate element moving position", respectively, according to this invention.

The second compensation mechanism 190 has a second biasing member 191 in the form of a coil spring 191a, and a covering member 192 for housing the second biasing member 191. The coil spring 191a, the second biasing member 191 and the covering member 192 are example embodiments that correspond to the "coil spring", the "second biasing member" and the "covering member", respectively, according to this invention.

Figure 7:
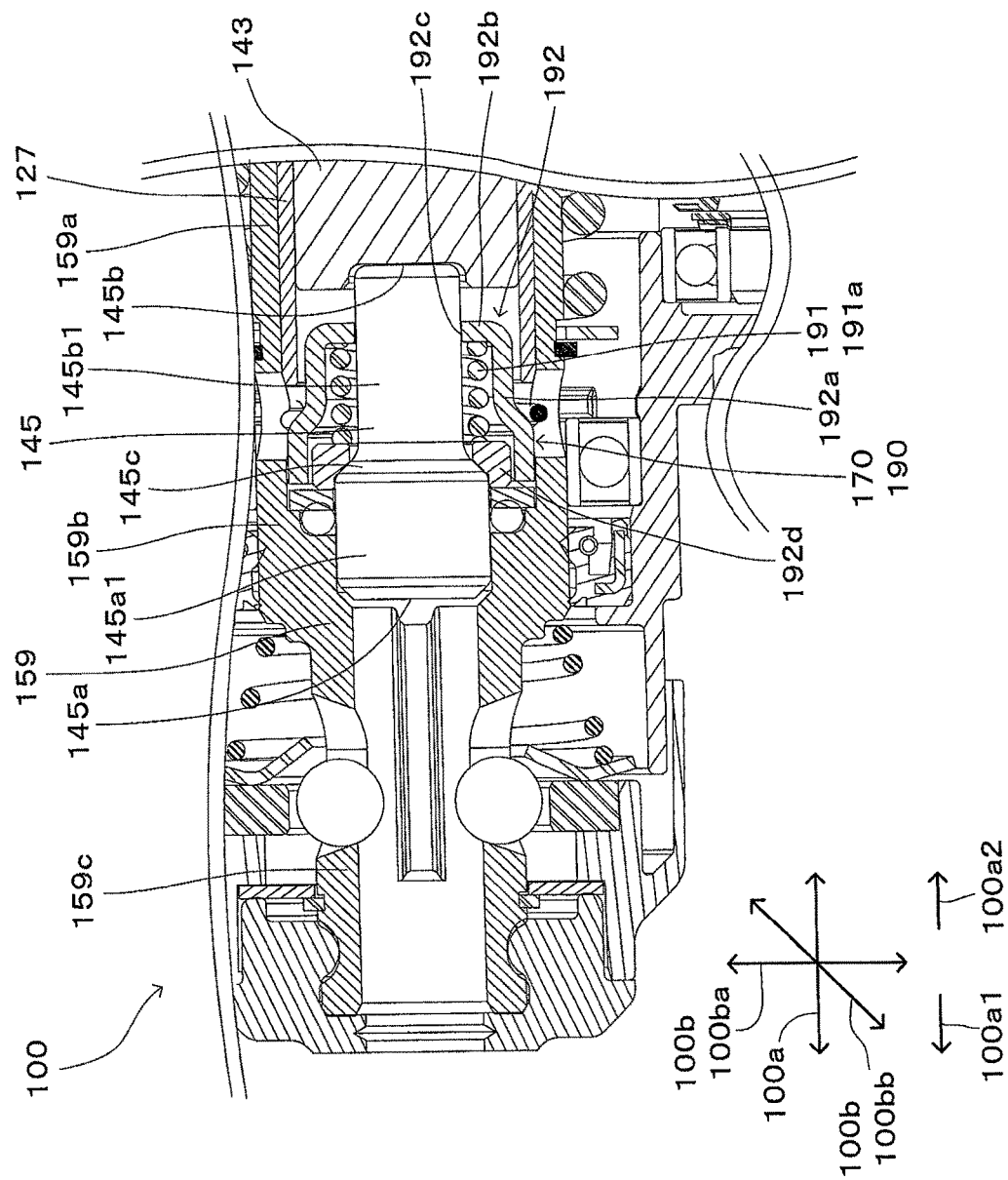
FIG. 7 is an explanatory drawing for illustrating an outline of a second compensation mechanism.

As shown in FIG. 7, the second compensation mechanism 190 is arranged to extend over the piston housing region 159a and the impact bolt housing region 159b within the tool holder 159. The impact bolt 145 has a large-diameter region 145a1 including a front end 145, a small-diameter region 145b1 including a rear end 145b, and a stepped region 145c formed between the large-diameter region 145a1 and the small-diameter region 145b1. The large-diameter region 145a1, the front end 145a, the small-diameter region 145b1, the rear end 145b, and the stepped region 145c are example embodiments that correspond to the "first region", the "first end", the "second region", the "second end" and the "intermediate region", respectively, according to this invention.

As shown in FIG. 7, the covering member 192 has a longitudinal wall 192a extending in the longitudinal direction 100a, a transverse wall 192b extending in the transverse direction 100b, and an opening 192c formed in the transverse wall 192b. The longitudinal wall 192a, the transverse wall 192b and the opening 192c are example embodiments that correspond to the "longitudinal wall", the "transverse wall" and the "covering member opening", respectively, according to this invention. With this structure, the covering member 192 covers the large-diameter region 145a1, the stepped region 145c and at least part of the small-diameter region 145b1 of the impact bolt 145. Part of the small-diameter region 145b1 which is not covered by the covering member 192 protrudes to the rear side 100a2 from the opening 192c.

As shown in FIG. 7, the coil spring 191a is arranged between the transverse wall 192b and the stepped region 145c and biases the stepped region 145c. Further, a ring-like member 192d is disposed between a front end of the coil spring 19a and the stepped region 145c and configured to be allowed to linearly reciprocate. With this structure, the second compensation mechanism 190 can bias the impact bolt 145 to the front side 100a1.

(Operation of Volume Compensation Mechanism)

Operation of the volume compensation mechanism 170 is now described with reference to FIGS. 8 to 11. The volume compensation mechanism 170 exerts its function when the tool bit 119 performs a linear driving operation. Specifically, FIGS. 8 to 11 show the hammer drill 100 in hammer drill mode. In use of the hammer drill 100, the user presses the tool bit 119 against a workpiece. Thus, the impact bolt 145 is pushed to the rear side 100a2 by the tool bit 119. The position of the impact bolt 145 in this state defines the impact bolt reference position 1451.

Figure 8:
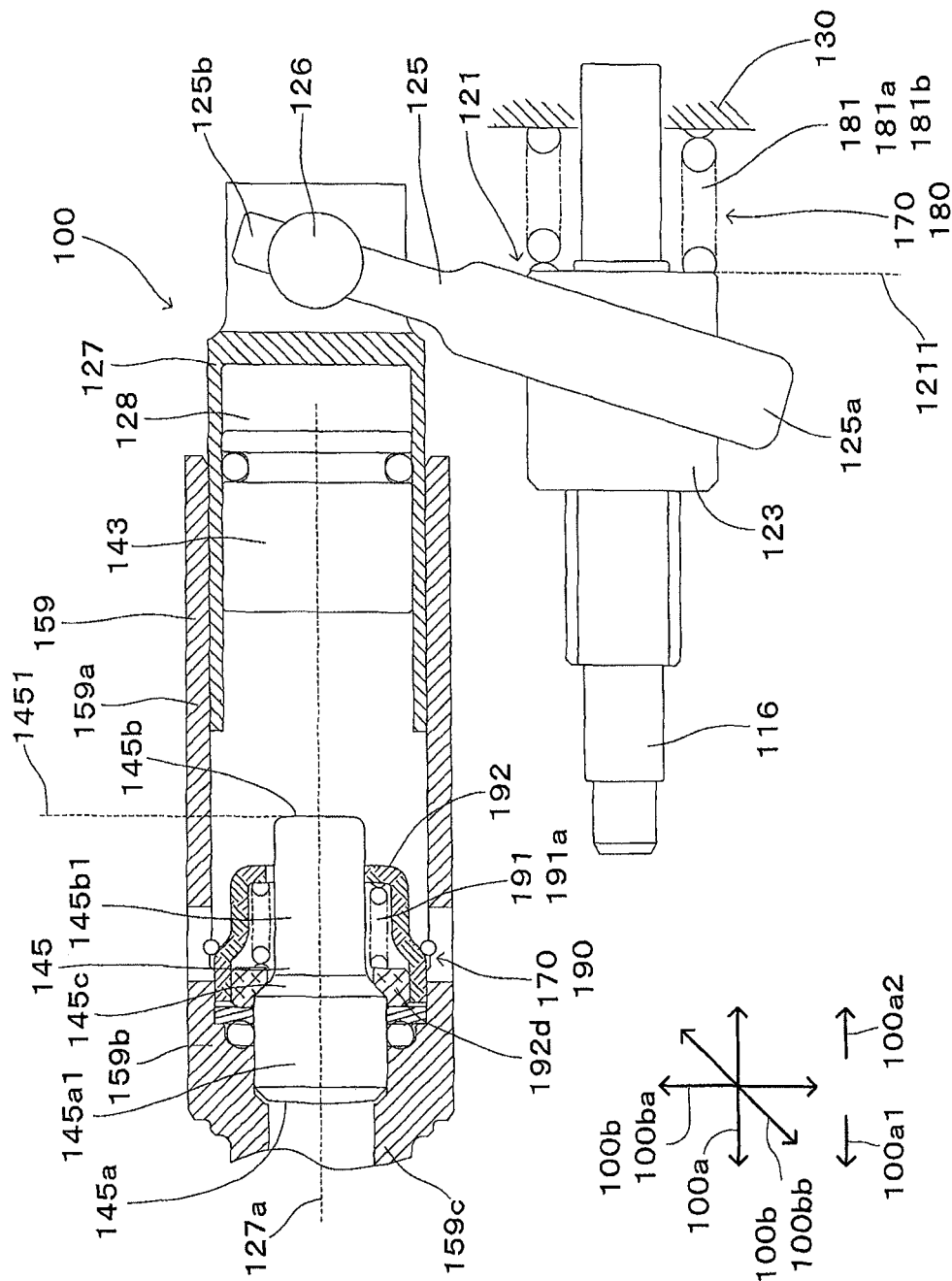
FIG. 8 is an explanatory drawing for showing operations of the first compensation mechanism and the second compensation mechanism.
Figure 9:
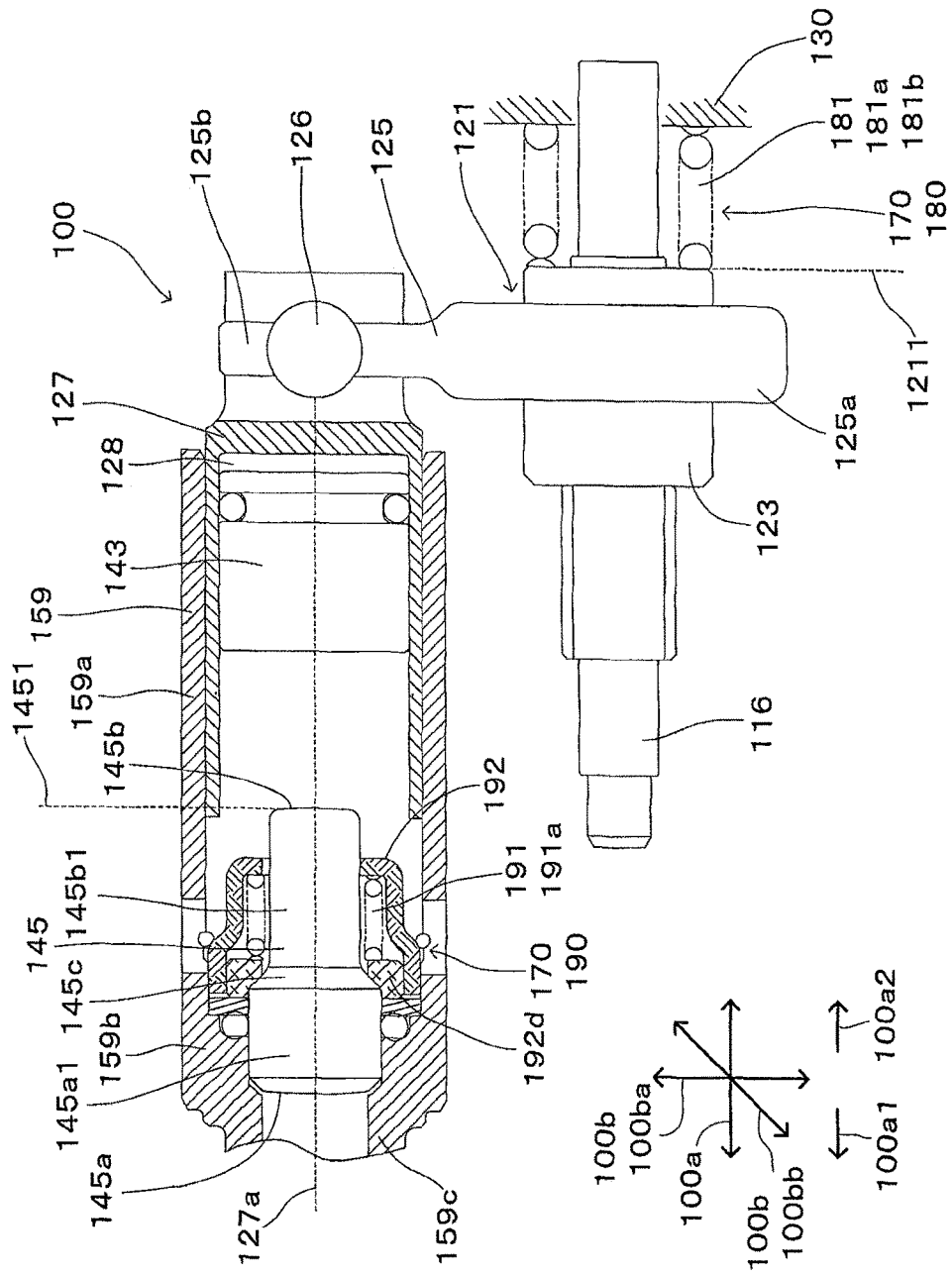
FIG. 9 is an explanatory drawing for showing operations of the first compensation mechanism and the second compensation mechanism.

FIG. 8 shows a state in which the shaft part 125b of the swinging shaft 125 is located on the rear side 100a2. In this state, the swinging mechanism 121 is placed in the swinging mechanism reference position 1211, and the impact bolt 145 is placed in the impact bolt reference position 1451. The shaft part 125b is moved to the front side 100a1 along with rotation of the intermediate shaft 116. FIG. 9 shows a state in which the piston 127 has been moved to the front side 100a1 along with the movement of the shaft part 125b, and air of the air chamber 128 has been compressed to the maximum.

Figure 10:
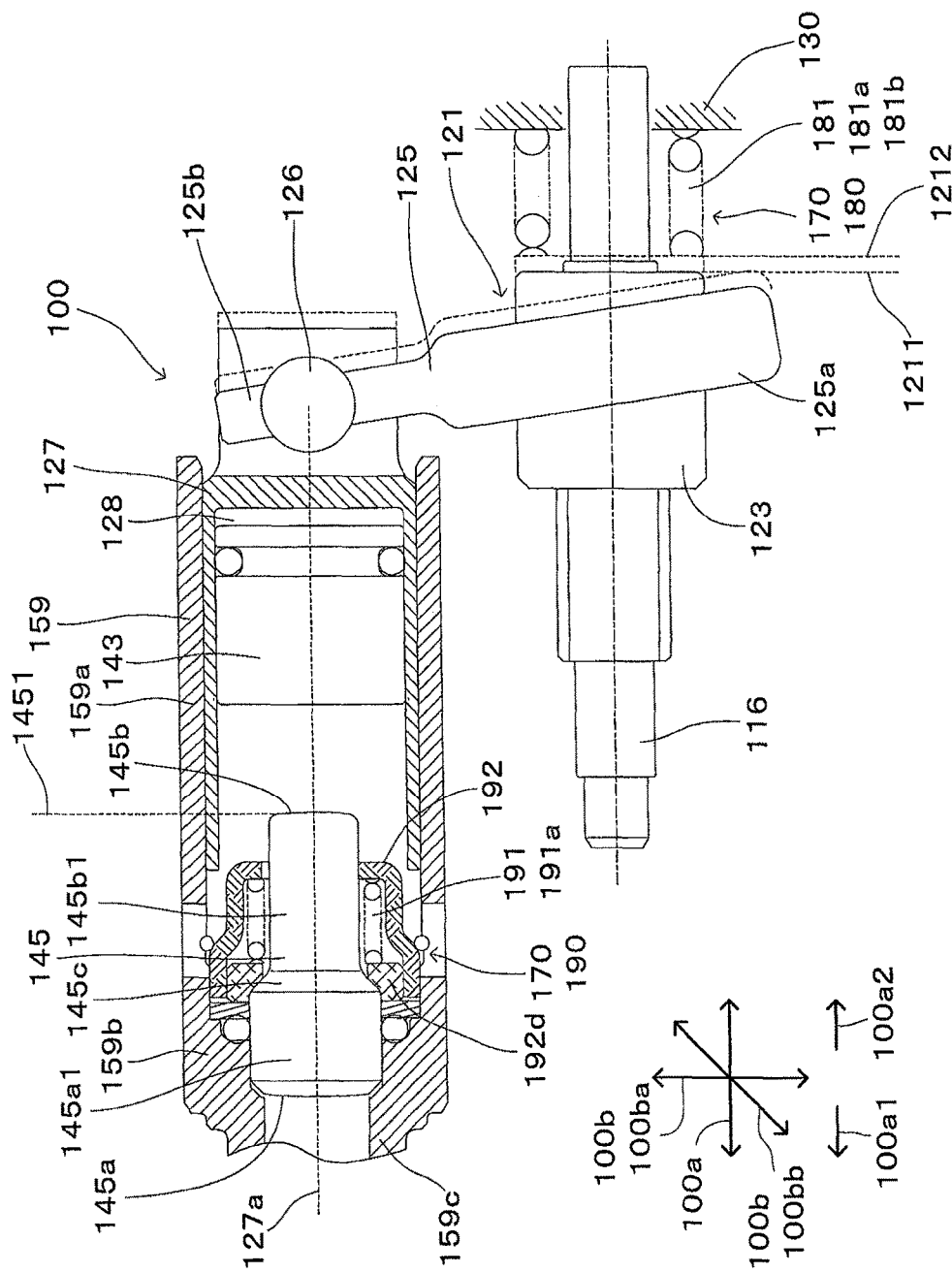
FIG. 10 is an explanatory drawing for showing operations of the first compensation mechanism and the second compensation mechanism.

As shown in FIG. 10, the piston 127 is moved to the rear side 100a2 by a reaction force generated when air of the air chamber 128 is compressed to the maximum. The coil spring 181b is compressed along with the movement of the piston 127, and the swinging mechanism 121 is moved from the swinging mechanism reference position 1211 to the swinging mechanism moving position 1212. In this manner, the first compensation mechanism 180 serves to suppress vibration by cushioning the reaction force.

When the piston 127 is moved from the front side 100a1 to the rear side 100a2 as the swinging mechanism 121 is moved from the swinging mechanism reference position 1211 to the swinging mechanism moving position 1212, the volume of the air chamber 128 is increased. The increase of the volume of the air chamber 128 is mainly caused by inflow of air into the air chamber 128 through an air hole (not shown) which is provided for smooth driving of the piston 127.

From this state, the shaft part 125b further swings to the front side 100a1. The swinging mechanism 121 is biased by the coil spring 181b and moved from the swinging mechanism moving position 1212 to the swinging mechanism reference position 1211, which causes the piston 127 to move to the front side 100a1.

FIG. 11 shows the state immediately after the striker 143 collides with the impact bolt 145 by expansion of air of the air chamber 128 and the tool bit 119 is linearly driven. A reaction force generated when the tool bit 119 collides with the workpiece is transmitted to the impact bolt 145 via the tool bit 119, and the impact bolt 145 is moved from the impact bolt reference position 1451 to the impact bolt moving position 1452. The impact bolt 145 collides with the striker 143 at the impact bolt moving position 1452, and the striker 143 is moved to the rear side 100a2. By this movement, the volume of the air chamber 128 is compensated. Further, the impact bolt 145 placed at the impact bolt moving position 1452 is biased by the coil spring 191a and returned to the impact bolt reference position 1451.

Further, the distance between the swinging mechanism reference position 1211 and the swinging mechanism moving position 1212 in the longitudinal direction 100a is equal to the distance between the impact bolt reference position 1451 and the impact bolt moving position 1452 in the longitudinal direction 100a.

By repeating the cycle as described above with reference to FIGS. 8 to 11, the hammer drill 100 is made capable of performing an operation while exerting the vibration suppressing function via the first compensation mechanism 180 and compensating for changes in the volume of the air chamber 128, which are caused by movement of the first compensation mechanism 180, via the second compensation mechanism 190. Specifically, by providing the above-described structure, the hammer drill 100 can be provided which can realize vibration suppression and reduction of unstable driving elements of the striker 143.

Second Embodiment

A hammer drill 200 according to a second embodiment of the present invention is now described with reference to FIGS. 12 and 13. The hammer drill 200 of the second embodiment is different from the hammer drill 100 of the first embodiment mainly in the arrangement of the driving motor 110 and the intermediate shaft 116 and the structure of the first compensation mechanism 180. In the description of the hammer drill 200, components or elements which have the same function as those of the hammer drill 100 are given like numerals and are not described. The hammer drill 200 is an example embodiment that corresponds to the "power tool" according to the present invention.

As shown in FIG. 12, in the hammer drill 200, the rotation axis 110a of the driving motor 110 is arranged to cross the rotation axis 116c of the intermediate shaft 116 in the body housing 101. In order to transmit rotation of the driving motor 110 to the intermediate shaft 116 in this arrangement, the driven gear member 118 is formed by a bevel gear 118a. The driven gear member 118 and the bevel gear 118a are example embodiments that correspond to the "driven gear member" and the "bevel gear", respectively, according to the present invention.

The handgrip 109 is formed in an annular shape, and a battery mounting part 109c for mounting a battery 109d is formed on the lower end of the handgrip 109.

As shown in FIG. 13, the bevel gear 118a has a transversely extending part 118b and gear teeth 118c formed in the transversely extending part 118b. The first compensation mechanism 180 includes a ring-like member 183 which is linearly movably disposed on the rear side 100a2 of the swinging mechanism 121, and the first biasing member 181 disposed between the ring-like member 183 and the transversely extending part 118b. A conical spring 181 c is used as the elastic element 181 a for forming the first biasing member 181. A large-diameter part 181d of the conical spring 181c abuts on the transversely extending part 118b, and a small-diameter part 181e of the conical spring 181c abuts on the ring-like member 183. The transversely extending part 118b, the conical spring 181c, the large-diameter part 181d and the small-diameter part 181e are example embodiments that correspond to the "transversely extending part", the "conical spring", the "large-diameter part" and the "small-diameter part", respectively, according to the present invention.

The volume compensation mechanism 170 of the hammer drill 200 is capable of performing an operation equivalent to that of the volume compensation mechanism 170 of the hammer drill 100 via the first compensation mechanism 180 having the above-described structure and the second compensation mechanism 190. Therefore, the hammer drill 200 can be provided which can realize vibration suppression and reduction of unstable driving elements of the striker 143.

The power tool according to this invention is not limited to those having the above-described structures. For example, the driving motor 110 and the intermediate shaft 116 may be differently arranged, and the driven gear member 118 may have a different structure. Further, other structures may be additionally provided.

In view of the nature of the above-described invention, the power tool according to this invention can be provided with the following features. Each of the features can be used separately or in combination with the other, or in combination with the claimed invention.

(Aspect 1)

The support member has a plate-like part and a flange ring part integrally formed with the plate-like part, and the flange ring part has high wear resistance compared with the plate-like part, and has a region which directly abuts on the swinging mechanism and a region forming the support member hole.

(Aspect 2)

The first biasing member arrangement region has a guide part which protrudes from the second side to the first side, and the support member and the elastic element are arranged on the guide part.

(Aspect 3)

The rotation axis of the intermediate shaft and axes of contraction and expansion of the coil springs are arranged on the same line in the transverse direction.

(Aspect 4)

The distance between the swinging mechanism reference position and the swinging mechanism moving position in the longitudinal direction is equal to the distance between the intermediate element reference position and the intermediate element moving position in the longitudinal direction.

(Correspondences Between the Features of the Embodiment and the Features of the Invention)

The above-described embodiment is a representative example for embodying the present invention, and the present invention is not limited to the structures that have been described as the representative embodiment. Correspondences between the features of the embodiments and the features of the invention are as follow:

The hammer drill 100, 200 is an example embodiment that corresponds to the "power tool" according to the present invention. The tool bit 119 is an example embodiment that corresponds to the "tool accessory" according to the present invention. The body housing 101 is an example embodiment that corresponds to the "body" according to the present invention. The driving motor 110 is an example embodiment that corresponds to the "driving motor" according to the present invention. The output shaft 111, the pinion gear 113 and the rotation axis 110a are example embodiments that correspond to the "output shaft", the "output gear" and the "first rotation axis", respectively, according to the present invention. The intermediate shaft 116 and the rotation axis 116c are example embodiments that correspond to the "rotary shaft member" and the "second rotation axis", respectively, according to the present invention. The driven gear member 117, 118, the gear teeth 117a and the longitudinally extending part 117b are example embodiments that correspond to the "driven gear member", the "gear teeth", and the "longitudinally extending part", respectively, according to the present invention. The bearing 116a and the bearing 116b are example embodiments that correspond to the "first bearing member" and the "second bearing member", respectively, according to the present invention. The striking mechanism 120 and the swinging mechanism 121 are example embodiments that correspond to the "striking mechanism" and the "swinging mechanism", respectively, according to the present invention. The piston 127, the striker 143 and the impact bolt 145 are example embodiments that correspond to the "cylinder", the "striking element" and the "intermediate element", respectively, according to this invention. The air chamber 128 is an example embodiment that corresponds to the "air chamber" according to the present invention. The piston moving axis 127a is an example embodiment that corresponds to the "cylinder moving axis" according to the present invention. The longitudinal direction 100a, the transverse direction 100b, the front side 100a1 and the rear side 100a2c are example embodiments that correspond to the "longitudinal direction", the "transverse direction", the "first side" and the "second side", respectively, according to the present invention. The volume compensation mechanism 170, the first compensation mechanism 180 and the second compensation mechanism 190 are example embodiments that correspond to the "volume compensation mechanism", the "first compensation mechanism" and the "second compensation mechanism", respectively, according to this invention. The swinging mechanism reference position 1211 and the swinging mechanism moving position 1212 are example embodiments that correspond to the "swinging mechanism reference position" and the "swinging mechanism moving position", respectively, according to this invention. The support member 182 and the first biasing member 181 are example embodiments that correspond to the "support member" and the "first biasing member", respectively, according to this invention. The front region 182a, the rear region 182b and the hole 182c are example embodiments that correspond to the "swinging mechanism side region", the "elastic element side region" and the "support member hole", respectively, according to the present invention. The elastic element 181 a and the coil spring 181 b are example embodiments that correspond to the "elastic element" and the "coil spring", respectively, according to the present invention. The arrangement region 130a is an example embodiment that corresponds to the "first biasing member arrangement region" according to the present invention. The impact bolt reference position 1451 and the impact bolt moving position 1452 are example embodiments that correspond to the "intermediate element reference position" and the "intermediate element moving position", respectively, according to this invention. The coil spring 191a, the second biasing member 191 and the covering member 192 are example embodiments that correspond to the "coil spring", the "second biasing member" and the "covering member", respectively, according to this invention. The large-diameter region 145a1, the front end 145, the small-diameter region 145b1, the rear end 145b, and the stepped region 145c are example embodiments that correspond to the "first region", the "first end", the "second region", the "second end" and the "intermediate region", respectively, according to this invention. The longitudinal wall 192a, the transverse wall 192b and the opening 192c are example embodiments that correspond to the "longitudinal wall", the "transverse wall" and the "covering member opening", respectively, according to this invention. The driven gear member 118 and the bevel gear 118a are example embodiments that correspond to the "driven gear member" and the "bevel gear", respectively, according to the present invention. The transversely extending part 118b, the conical spring 181c, the large-diameter part 181 d and the small-diameter part 181e are example embodiments that correspond to the "transversely extending part", the "conical spring", the "large-diameter part" and the "small-diameter part", respectively, according to the present invention.

DESCRIPTION OF THE NUMERALS 100, 200 hammer drill (power tool)
100a longitudinal direction
100a1 front side (first side)
100a2 rear side (second side)
100b transverse direction
100ba height direction
100bb width direction (transverse direction)
101 body housing (body)
103 motor housing
105 gear housing 109 handgrip
109a trigger
109b power cable
109c battery mounting part
109d battery
110 driving motor
110a rotation axis (first rotation axis)
111 output shaft
111a bearing
111b bearing
112 fan
113 pinion gear (output gear)
115 pin member
116 intermediate shaft (rotary shaft member)
116a bearing (first bearing member)
116b bearing (second bearing member)
116c rotation axis
117 driven gear member
117a gear teeth
117b longitudinally extending part
118 driven gear member
118a bevel gear
118b transversely extending part
118c gear teeth
119 tool bit (tool accessory)
120 striking mechanism
121 swinging mechanism
1211 swinging mechanism reference position
1212 swinging mechanism moving position
123 rotary body
123a clutch teeth
123b outer circumferential surface
123c steel ball
125 swinging shaft
125a annular part
125b shaft part
126 joint pin
127 piston (cylinder)
127a piston moving axis (cylinder moving axis)
128 air chamber
130 inner housing
130a arrangement region (first biasing member arrangement region)
130b guide part
130c screw
130d washer
140 striking element
143 striker (striking element)
145 impact bolt (intermediate element)
145a front end (first end)
145a1 large-diameter region (first region)
145b rear end (second end)
145b1 small-diameter region (second region)
145c stepped region (intermediate region)
1451 impact bolt reference position
1452 impact bolt moving position
150 rotation transmitting mechanism
151 first gear
153 second gear
159 tool holder
159a piston housing region
159b impact bolt housing region
159c tool bit housing region
160 clutch cam
160a clutch teeth
170 volume compensation mechanism
180 first compensation mechanism 181 first biasing member
181a elastic element
181b coil spring
181c conical spring
181d large-diameter part
181e small-diameter part
182 support member
182a front region (swinging mechanism side region)
182b rear region (elastic element side region)
182c hole (support member hole)
182d plate-like part
182e flange ring part
183 ring-like member
190 second compensation mechanism
191 second biasing member
191a coil spring
192 covering member
192a longitudinal wall
192b transverse wall
192c opening (covering member opening)
192d ring-like member

What we claim is:

1. A power tool, which performs a prescribed operation on a workpiece by linearly moving a tool accessory, comprising:
 a body, which body houses:
 a tool holder for holding the tool accessory,
 a driving motor,
 a rotary shaft member that is rotationally driven by the driving motor, and
 a striking mechanism that linearly drives the tool accessory along with rotation of the rotary shaft member, wherein the striking mechanism includes:
 a cylinder that is configured to be allowed to linearly reciprocate,
 a striking element that is housed within the cylinder and configured to be allowed to linearly reciprocate within the cylinder,
 an air chamber that is defined by the striking element and the cylinder,
 a swinging mechanism that is connected to the cylinder and reciprocates the cylinder by swinging along with rotation of the rotary shaft member, and
 an intermediate element that is housed within the tool holder and configured to be allowed to linearly reciprocate, and
 the power tool is configured to cause the striking element to collide with the intermediate element via pressure fluctuations caused in the air chamber by reciprocating movement of the cylinder and to further cause the intermediate element to collide with the tool accessory, thereby linearly moving the tool accessory, wherein:
 the power tool defines a longitudinal direction parallel to a cylinder moving axis and a transverse direction crossing the longitudinal direction,
 the longitudinal direction defines a first side to which the cylinder compresses air of the air chamber, and a second side opposite to the first side,
 the body further houses a volume compensation mechanism for compensating the volume of the air chamber,
 the volume compensation mechanism includes a first compensation mechanism and a second compensation mechanism,
 the first compensation mechanism is configured to allow the swinging mechanism to reciprocate between a swinging mechanism reference position located on the first side and a swinging mechanism moving position located on the second side, and has a first biasing member that biases the swinging member so as to place the swinging mechanism in the swinging mechanism reference position when the swinging mechanism is placed in the swinging mechanism moving position, the second compensation mechanism is configured to allow the intermediate element to reciprocate between an intermediate element reference position located on the first side and an intermediate element moving position located on the second side, and has a second biasing member that biases the intermediate element so as to place the intermediate element in the intermediate element reference position when the intermediate element is placed in the intermediate element moving position, the volume compensation mechanism is further configured such that:

the first compensation mechanism moves the swinging mechanism from the swinging mechanism reference position to the swinging mechanism moving position by a reaction force generated by movement of the cylinder from the second side to the first side, and moves the cylinder to the second side along with the movement of the swinging mechanism, thereby increasing the volume of the air chamber, in the state that the volume of the air chamber is increased by the first compensation mechanism, the second compensation mechanism moves the intermediate element from the intermediate element reference position to the intermediate element moving position by a reaction force generated by the predetermined operation of the tool accessory, and moves the striking element to the second side along with movement of the intermediate element, thereby compensating the volume of the air chamber, and wherein a distance between the swinging mechanism reference position and the swinging mechanism moving position in the longitudinal direction is equal to a distance between the intermediate element reference position and the intermediate element moving position in the longitudinal direction.

2. The power tool as defined in claim 1, wherein:

the rotary shaft member extends in the longitudinal direction, the body has a first bearing member that supports a prescribed region of the rotary shaft member on the first side, a second bearing member that supports a prescribed region of the rotary shaft member on the second side, and a first biasing member arrangement region in which one end of the first biasing member is arranged, and a prescribed region of the second bearing member and a prescribed region of the first biasing member are arranged on the same line in the transverse direction.

3. The power tool as defined in claim 1, wherein:

the driving motor has an output shaft having an output gear, the rotary shaft member has a driven gear member having gear teeth for engagement with the output gear, and a prescribed region of the gear teeth and a prescribed region of the first biasing member are arranged on the same line in the transverse direction.

4. The power tool as defined in claim 1, wherein:

the driven gear member has a longitudinally extending part that extends in the longitudinal direction and is press-fitted onto the rotary shaft member, the first biasing member has a support member that extends in the transverse direction and an elastic element that is arranged between the support member and the first biasing member arrangement region and biases the support member from the second side to the first side, the support member has a swinging mechanism side region that abuts on the swinging mechanism, an elastic element side region that abuts on the elastic element, and a support member hole that extends through the longitudinally extending part, and the support member is configured to be allowed to slide in a reciprocating manner with respect to the longitudinally extending part, and a prescribed region of the longitudinally extending part and a prescribed region of the elastic element are arranged on the same line in the transverse direction.

5. The power tool as defined in claim 1, wherein the elastic element comprises a plurality of coil springs, and the coil springs are arranged to be equally spaced apart from the support member hole on opposite sides of the support member hole in the transverse direction.

6. The power tool as defined in claim 1, wherein:

the driving motor has an output shaft having an output gear, and a first rotation axis that is defined by rotation of the output shaft, the rotary shaft member has a driven gear member that is engaged with the output gear, and a second rotation axis that is defined by rotation of the rotary shaft member, the driven gear member comprises a bevel gear and has a transversely extending part extending in the transverse direction, the driving motor and the rotary shaft member are arranged such that the first rotation axis and the second rotation axis cross each other, and the first biasing member comprises an elastic element arranged between the transversely extending part and the swinging mechanism.

7. The power tool as defined in claim 6, wherein:

the elastic element comprises a conical spring having a large-diameter part and a small-diameter part, and the large-diameter part is arranged toward the transversely extending part and the small-diameter part is arranged toward the swinging mechanism.

8. The power tool as defined in claim 7, wherein:

the intermediate element has a first region including a first end on the first side, a second region including a second end on the second side, and an intermediate region formed between the first region and the second region, the second compensation mechanism has a covering member that covers the first region, the intermediate region and at least part of the second region, the covering member has a longitudinal wall extending in the longitudinal direction, a transverse wall extending in the transverse direction, and a covering member opening that is formed in the transverse wall and through which the second region is inserted, and the second biasing member comprises a coil spring which is arranged between the transverse wall and a prescribed region of the intermediate region.

9. The power tool as defined in claim 1, wherein the first compensation mechanism defines a vibration suppressing mechanism during the operation of the power tool.

* * * * *